US 9,876,888 B2

(12) United States Patent
Vishwanath

(10) Patent No.: US 9,876,888 B2
(45) Date of Patent: Jan. 23, 2018

(54) EXCHANGING CONTACT INFORMATION BASED ON IDENTIFYING SOCIAL INTERACTION

(71) Applicant: Verizon Patent and Licensing Inc., Basking Ridge, NJ (US)

(72) Inventor: Karthik Vishwanath, Bangalore (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/810,646

(22) Filed: Jul. 28, 2015

(65) Prior Publication Data
US 2017/0034333 A1 Feb. 2, 2017

(51) Int. Cl.
*H04M 1/725* (2006.01)
*H04M 3/42* (2006.01)
*H04W 4/00* (2009.01)
*H04W 4/20* (2009.01)
*G06F 1/16* (2006.01)

(52) U.S. Cl.
CPC ..... *H04M 1/72527* (2013.01); *H04M 1/7253* (2013.01); *H04M 3/42127* (2013.01); *H04W 4/008* (2013.01); *G06F 1/163* (2013.01); *H04M 2203/655* (2013.01); *H04W 4/206* (2013.01)

(58) Field of Classification Search
CPC ..... H04W 4/043; H04W 4/023; H04W 16/28; H04W 4/008; H04W 4/206; G06F 1/163; G06F 3/017; H04M 1/7253
See application file for complete search history.

(56) References Cited

U.S. PATENT DOCUMENTS

| | | | |
|---|---|---|---|
| 2009/0117883 A1* | 5/2009 | Coffing | H04L 12/5895 455/414.1 |
| 2010/0112989 A1* | 5/2010 | Andreasson | H04L 67/18 455/414.2 |
| 2016/0006850 A1* | 1/2016 | Ohki | H04M 1/7253 455/557 |
| 2016/0337161 A1* | 11/2016 | Huibers | H04L 29/06333 |

* cited by examiner

*Primary Examiner* — Nam Huynh

(57) ABSTRACT

A wearable device, such as a smart watch, detects a movement by a user, and the wearable device may compare the detected user movement to known movement patterns to identify a social interaction. The wearable device may forward a notice to an associated mobile device, such as a smart phone paired to the wearable device, and the notice may identify the detected social interaction. The mobile device identifies another user involved with the social interaction, such as another user performing a movement similar to the movement detected by the wearable device. The mobile device may exchange contact information with another mobile device associated with the other user.

20 Claims, 9 Drawing Sheets

EXCHANGING CONTACT INFORMATION BASED ON IDENTIFYING SOCIAL INTERACTION

BACKGROUND INFORMATION

A mobile device, such as a smart phone, may be used with one or more additional devices that provide additional functions and/or features that are not present on the mobile device by itself. For example, a mobile device may be used with smart glasses that capture and/or present visual data to a user, headphones that capture and/or present audio data to a user, smart watches or fitness trackers that monitor activities of a user, etc. Social interactions and habits may evolve based on the availability and use of these devices.

DETAILED DESCRIPTION OF PREFERRED EMBODIMENTS

The following detailed description refers to the accompanying drawings. The same reference numbers in different drawings identify the same or similar elements.

In systems and methods described herein, a wearable device, such as a smart watch, may detect movements by a user, and the wearable device may compare the detected user movements to known movement patterns associated with various social interactions, such as a hand shake, hug, wave, kiss, hand gesture, etc. If the detected movement corresponds to one of the movement patterns associated with social interactions, the wearable device may identify a social interaction associated with the matching movement pattern. The wearable device may forward a notice to an associated mobile device, such as a smart phone paired to the wearable device. The notice may identify the social interaction and one or more attributes of the social interaction. In some implementations, the mobile device may detect the attributes. The attributes may identify, for example, a location and/or time of the social interaction, aspects of the detected movement, other sensor readings, etc.

The mobile device may identify another mobile device associated with another user involved with the social interaction. For example, the mobile device may report one or more attributes (e.g., detected motion pattern, location of the motion, time of the motion, etc.) of the social interaction to an application server, and the application server may identify another mobile device reporting a similar social interaction. The mobile devices associated with the social interaction may exchange contact information associated with the respective users. In this way, users may initiate an exchange of names or other contact information between the mobile devices based on a movement or other social interaction.

Figure 1:
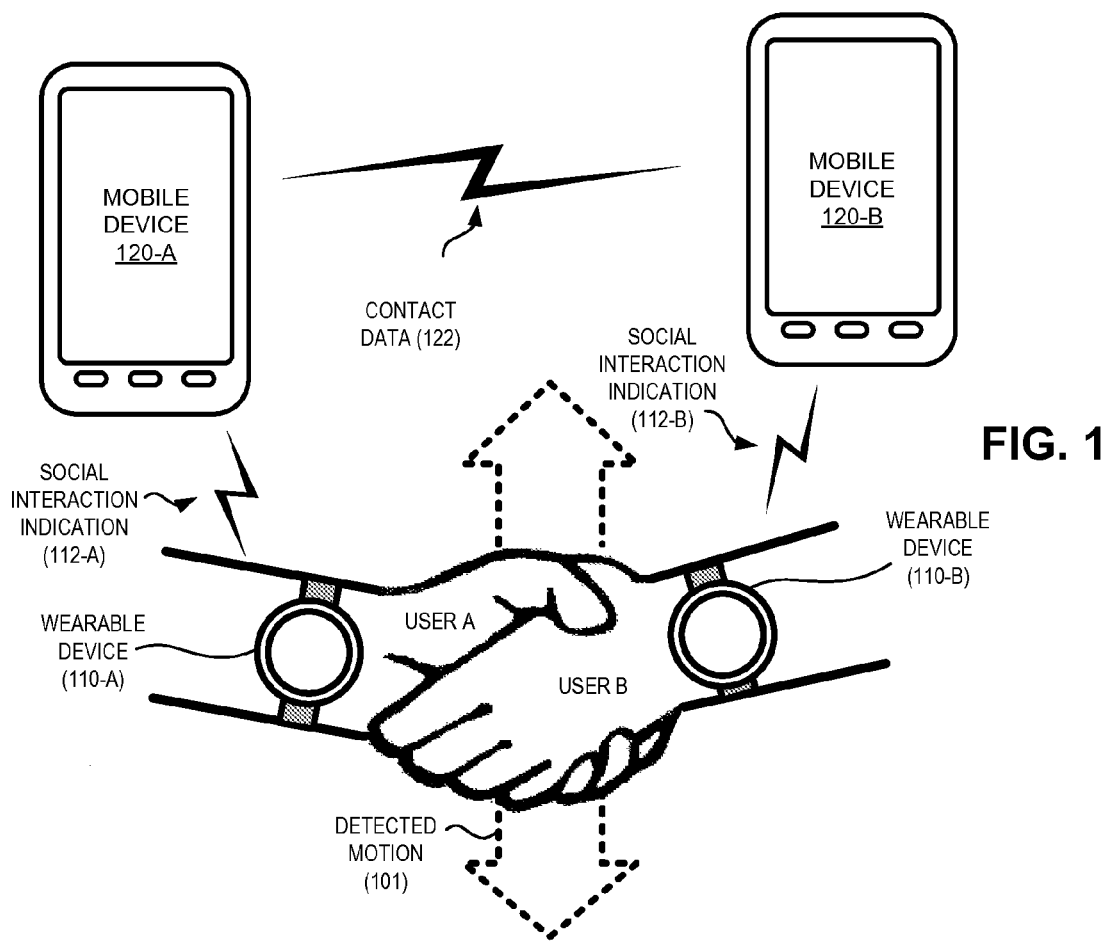
FIG. 1 is a diagram showing an example of the principles described herein.

FIG. 1 is a diagram showing an example of the systems and methods described herein. In the example shown in FIG. 1, a user (labeled in FIG. 1 as "User A") is associated with a wearable device 110-A and a mobile device 120-A, and another user (labeled in FIG. 1 as "User B") is associated with another wearable device 110-B and another mobile device 120-B. When a social interaction occurs between the users, wearable devices 110-A and/or 110-B (referred to collectively as wearable devices 110 or individually as wearable device 110) may detect a motion 101. For example, if the users are performing a handshake, wearable devices 110-A and 110-B may detect a repeated vertical hand motion with a velocity and range of motion associated with the handshake. Based on determining that detected motion 101 corresponds to a social interaction, wearable device 110-A may forward a social interaction indication 112-A to mobile device 120-A, and wearable device 110-B may forward a social interaction indication 112-B to mobile device 120-B. Social interaction indication 112-A/112-B may include data describing, for example, detected motion 101, the associated social interaction, a time when detected motion 101 occurred, etc.

In the example shown in FIG. 1, mobile device 120-A or 120-B (referred to collectively as mobile devices 120 or individually as mobile device 120) may determine attributes identified in social interaction indication 112-A/112-B. Mobile devices 120-A and 120-B may further determine additional attributes of the detected social interaction, such as a location associated with wearable device 110-A/110-B, when detected motion 101 occurred. Mobile devices 120-A and 120-B may selectively exchange contact data 112 if the determined attributes indicate that User-A and User-B are engaging in a common social interaction. For example, mobile devices 120-A and 120-B may identify the detected attributes to a remote, intermediate device (not shown in FIG. 1), and the intermediate device may determine that social interaction indications 112-A and 112-B relate to a common social interaction if social interaction indications 112-A and 112-B identify a similar detected motion 101 occurring within a region and during a time period. If social interaction indications 112-A and 112-B relate to a common social interaction, mobile devices 120-A and 120-B may exchange, directly or via the intermediate device, respective contact data 122 identifying Users A and B and/or associated contact information (e.g., addresses, telephone numbers, e-mail addresses, etc.).

Wearable device 110-A/110-B may include a smart watch, smart glasses, a fitness tracker, or other device that may be worn or otherwise coupled to a user. Wearable device 110 may include a motion sensor, such as an accelerometer, gyroscope, etc. that determines information regarding a movement of wearable device 110. Additionally, the motion sensor may detect a position and/or motion of an object or a person (e.g., a user of wearable device 110) attached to and/or otherwise monitored by wearable device 110.

Wearable device 110 may store movement patterns associated with a movement of wearable device 110 and/or an associated user during different social interactions. For example, a movement pattern may identify one or more motion directions, motion velocities, motion durations, etc.

associated with a movement during a social interaction. Wearable device 110 may compare detected motion 110 to the movement patterns for the social interactions, and wearable device 110 may determine that a social interaction occurred when detected motion 101 corresponds to a motion pattern for the social interaction.

In one example, the social interaction may relate to a specific motion or combinations of motions that are initially performed to initiate an exchange of contact data 122. In this way, users may initiate an exchange of contact data 122 by performing a particular motion (or combination of motions) that is unlikely to occur when the users do not intend to exchange contact data. For example, a right-handed handshake may be a conventional social greeting in many cultures, but a left-handed handshake may be relatively unusual. Some types of wearable devices 110 (e.g., a smart watch) may typically be worn on a user's left arm, so a left-handed shake may be detected by direct motion of the wearable device 110, whereas a right-handed handshake may be detected indirectly (e.g., by sensing vibrations that associated with the right-hand shake that are transmitted through a user's body to wearable device 110). Thus, a left-handed handshake (detected by wearable devices 110) may be interpreted by mobile devices 120 as an intentional indication by users to request an exchange of contact data 122. Wearable device 110 may be programmed to initiate the exchange of contact data 122 when a left-handed handshake is detected, but not when a conventional, right-handed handshake is detected.

Wearable devices 110 and mobile devices 120 may further include a short range wireless networking interface, such as a Bluetooth® wireless interface, a radio-frequency identification (RFID) interface, a near-field communications (NFC) wireless interface, infra-red (IR) communications interface, and/or any other type of interface to exchanges data. Additionally or alternatively, wearable device 110 and mobile device 120 may be connected with via a physical connection, such as a universal serial bus (USB) or a Lightning Wire® cable.

Mobile device 120 may include a portable communication device (e.g., a mobile phone, a smart phone, a phablet device, a global positioning system (GPS) device, and/or another type of wireless device); a laptop (e.g., with a wireless air card), tablet, or another type of portable computer; a media playing device; a portable gaming system; and/or any other type of mobile computer device with communication and output capabilities.

Mobile device 120 may receive social interaction indication 112 from wearable device 110, and may compare one or more attributes (e.g., a movement pattern detected by wearable device 110) identified in social interaction indication 112 with attributes of a social interaction reported by a different mobile device 120. When the attributes identified in social interaction indication 112 (collected by wearable device 110-A) correspond to attributes collected by another wearable device 120-B, mobile device 120-A and 120-B may infer that a common social interaction has occurred between associated users A and B and may initiate an exchange of contact data 122. If the attributes of the detected social interactions do not match (e.g., different motions are directed by wearables devices 110-A and 110-B), mobile device 120-A and 120-B may determine that a social interaction has not occurred between associated users A and B, and contact data 122 is not exchanged.

In one implementation, mobile device 120 may include one or more sensors to capture additional information regarding a user or a surrounding environment at the time of a social interaction (i.e., when the social interaction is detected and/or reported by wearable device 110). Mobile devices 120 may further compare sensor data to determine whether a social interaction has occurred. For example, mobile device 120 may include a location sensor, such as a sensor to receive a global positioning system (GPS) or other location data, or a component to dynamically determine a location of mobile device 120 (e.g., by processing and triangulating data/communication signals received from one or more base stations).

In another example, mobile device 120 may include an audio sensor (e.g., a microphone) to collect audio data associated with one or more users, and mobile device 120 may process the audio data to evaluate a social interaction between the users. For example, mobile devices 120 may evaluate collected audio data to determine whether the users are conversing (e.g., whether speech is detected) and whether the users are conversing with each other (e.g., similar speech patterns are detected). Additionally or alternatively, mobile device 120 may perform a speech-to-text analysis of the captured audio data. For example, mobile device 120 may determine that a user is uttering a greeting or another phrase associated with a social interaction.

In another example, mobile device 120 may include an image sensor (e.g., a camera) to collect image data associated with one or more users. For example, mobile device 120 may evaluate captured image data to determine whether another user is looking in the direction of mobile device 120 (e.g., toward an associated user). Mobile device 120 may determine that a social interaction is occurring if, for example, the other user is looking in the direction of mobile device 120 at a time associated with a detected motion. In another example, mobile device 120 may perform facial analysis of image data associated with a user. For example, mobile device 120 may determine whether a user is smiling or displaying another facial expression typically associated with a social interaction.

In another example, mobile device 120 may include or interface with a sensor device, such as a fitness monitor, that identifies attributes of a user, such as the user's heart rate, body temperature, respiration rate, etc. Mobile device 120 may use the attributes of an associated user to identify activities being performed by the user. For example, if a user has an elevated heart rate and is moving within a particular range of velocity (e.g., as detected by a GPS signal), mobile device 120 may determine that an associated user is walking. If another mobile device 120 determines that its user is moving is a similar velocity, in the same direction, and at the same time, mobile devices 120 may infer that the users are walking together.

In yet example, mobile device 120 may include a communications interface to communicate or otherwise detect another mobile device 120. For example, mobile device 120-A, after receiving social interaction indication 112-A, may attempt to detect a connection request (e.g., a Bluetooth® connect request) identifying mobile device 120-B associated with another user. If mobile device 120-A detects a short-range connection request identifying mobile device 120-B, mobile device 120-A may determine that mobile device 120-B (and the associated user) is in close physical proximity.

Although FIG. 1 depict exemplary components that may be used in one example, fewer components, additional components, different components, or differently arranged components than those illustrated in FIG. 1 may be used. Furthermore, components of wearable device 110 and/or mobile device 120 may perform one or more tasks described as being performed by one or more other components of components of wearable device 110 and/or mobile device 120. For example, wearable device 110 may include a location sensor, an audio sensor, and/or an image sensor that are described above with respect to mobile device 120.

Figure 2:
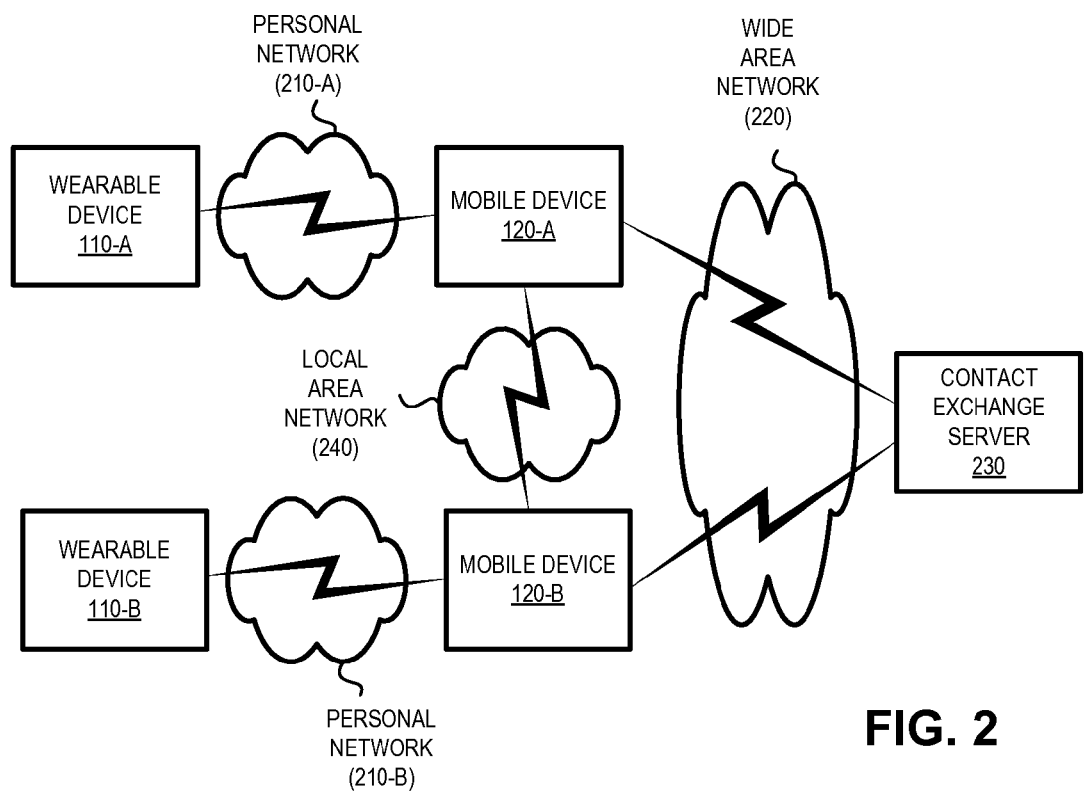
FIG. 2 is a diagram showing an exemplary environment in which the systems and methods described herein may be implemented.

FIG. 2 shows an exemplary environment 200 in which the systems and methods described herein may be implemented. As shown in FIG. 2, environment 200 may include wearable devices 110-A and 110-B, mobile devices 120-A and 120-B, personal area networks (PAN) or personal networks 210-A and 210-B (referred to collectively as personal networks 210 and individually as personal network 210), a wide area network 220, a contact exchange device 230, and/or a local area network 240.

Wearable devices 110-A and 110-B and mobile devices 120-A and 120-B may function as described above with respect to FIG. 1. For example, wearable devices 110-A and 110-B may detect movements by associated users, and mobile devices 120-A and 120-B may exchange contact information based on determining that the detected movements relate to a common social interaction.

A wearable device 110 and a mobile device 120 associated with a user may exchange data (e.g., social interaction indication 112) via an associated personal network 210. Personal network 210 may operate based on, for example, a Bluetooth® wireless interface, a RFID interface, a NFC wireless interface, IR communications interface, and/or any other type of interface to exchanges data between wearable device 110 and mobile device 120. Additionally or alternatively, wearable device 110 and mobile device 120 may be connected with via a physical connection such as a cable.

Mobile devices 120-A and 120-B may communicate with contact exchange device 230 via network 220. Network 220 may include a communications network, a data network, or a combination of networks that connect mobile devices 120-A and 120-B and contact exchange service 230. For example, network 220 may include a local area network (LAN), a wide area network (WAN), a metropolitan area network (MAN), a wireless network, an optical fiber (or fiber optic) network, an internet, the Internet, or a combination of these or other networks. In addition or alternatively, network 220 may include or be included in a wireless network capable of supporting wireless communications to/from one or more devices in environment 100. The wireless network may include, for example, a long-term evolution (LTE) network, another 3rd Generation Partnership Project (3GPP) 3G/4G network, Global System for Mobile Communications (GSM), wideband code division multiple access (WCDMA), Ultra Mobile Broadband (UMB), Universal Mobile Telecommunications System (UMTS), Code Division Multiple Access 1000 (CDMA2000), High-Speed Packet Access (HSPA), Worldwide Interoperability for Microwave Access (WiMax), enhanced high-rate packet data (eHRPD), or a network implemented in accordance with other wireless network standards, including future wireless network standards.

Contact exchange device 230 may include a computing device that compares attributes of a social interaction detected by wearable device 110-A with the attributes of a social interaction detected by another wearable device 110-B associated with another user. For example, contact exchange device 230 may compare a first movement pattern detected by wearable device 110-A and a second movement pattern detected by another wearable device 110-B. Additionally or alternatively, contact exchange device 230 may compare location data, image data, audio data, connection data, etc. associated with mobile devices 120-A and 120-B. In one implementation, contact exchange device 230 may, based on determining that mobile devices 120-A and 120-B are associated with a common social interaction, initiate an exchange of contact information between mobile devices 120-A and 120-B. For example, contact exchange device 230 may forward a network address or other data associated with mobile device 120-B to mobile device 120-A, and mobile device 120-A may use the network address to forward the contact data 122 to mobile device 120-B via network 220 and/or local area network 240.

Local area network 240 may connect mobile devices 120-A and 120-B located at a common location, and mobile devices 120-A and 120-B may exchange contact data 122 via local area network 240. For example, local area network 240 may be a wireless local area network (WLAN) based on the International Electrical and Electronics Engineers 802.11 protocol, or other short-range network via which mobile devices 120-A and 120-B may communicate. For example, mobile devices 120-A and 120-B may communicate via Bluetooth®, Wi-Fi®, and/or another short-range wireless network protocol. In another example, mobile devices 120-A and 120-B may communicate via a near field communication ("NFC") or an infrared-based communications such as Infrared Data Association (IrDA) protocols.

Although FIG. 2 shows exemplary components of environment 200, in other implementations, environment 200 may include fewer components, different components, differently arranged components, or additional components than those depicted in FIG. 2. Additionally or alternatively, one or more components of environment 200 may perform functions described as being performed by one or more other components of environment 200.

Figure 3:
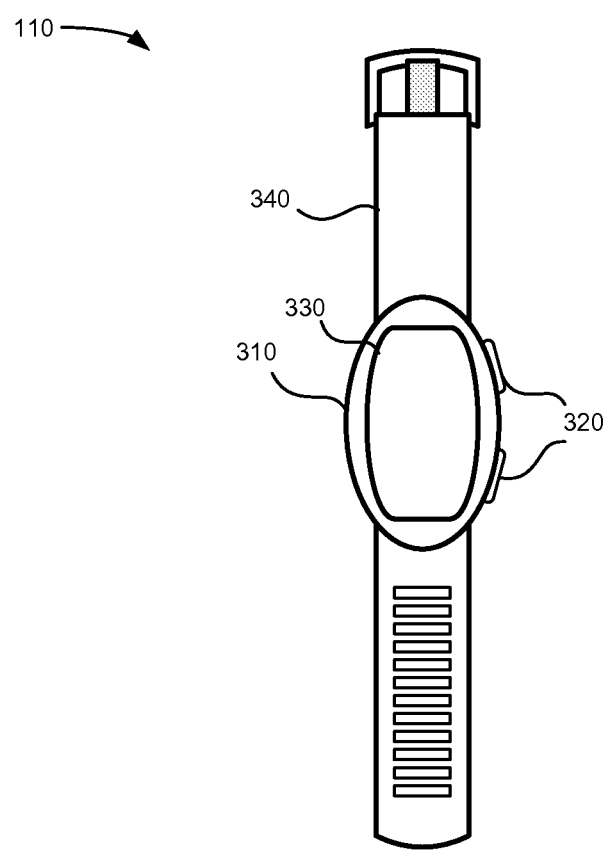
FIG. 3 shows an exemplary user device that may be included in the environment of FIG. 2.

FIG. 3 shows an exemplary user device 300 that may correspond to wearable device 110. As shown in FIG. 3, user device 300 may include a housing 310, one or more control buttons 320 to receive a user input, a display 330 to present visual data, and a connection mechanism 340, such as a watchband, that enables user device 300 to be worn by an associated user. According to other embodiments, user device 300 may comprise fewer components, additional components, different components, and/or a different arrangement of components than those illustrated in FIG. 3 and described herein.

Figure 4:
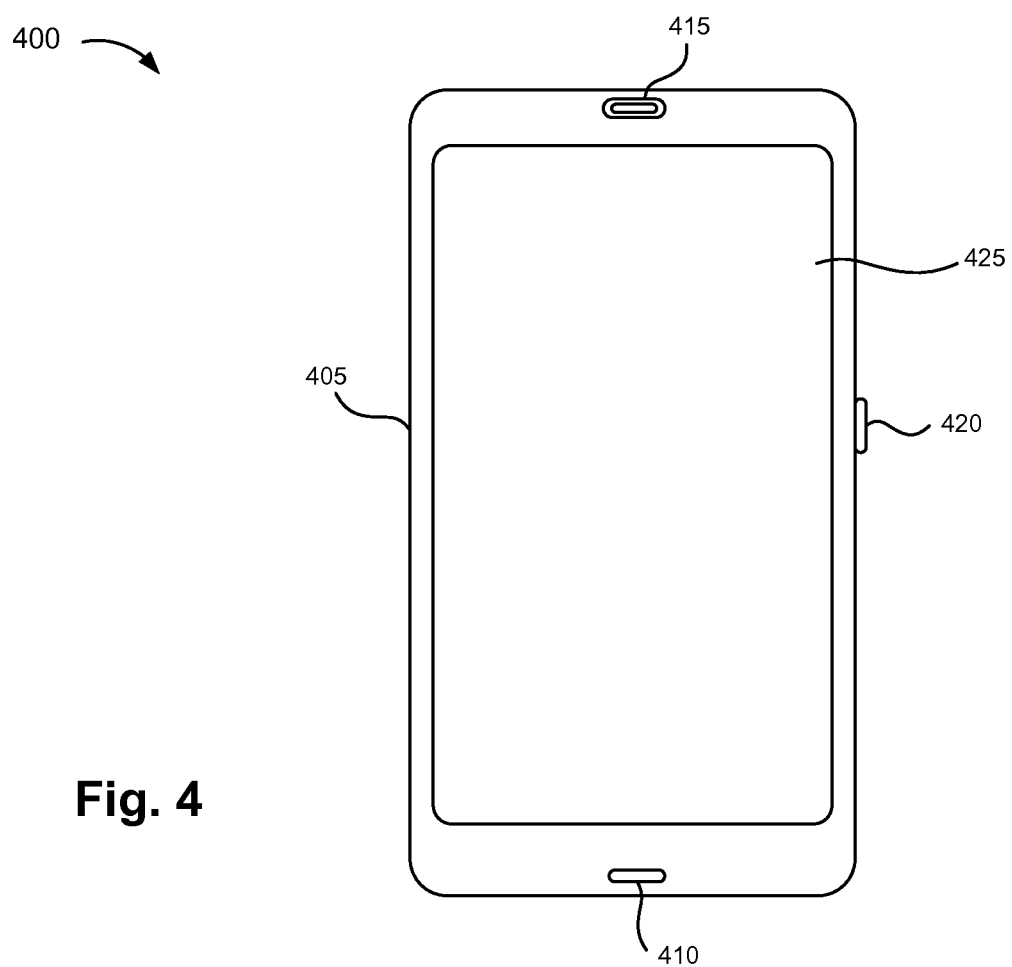
FIG. 4 shows an exemplary communications device that may be included in the environment of FIG. 2.

FIG. 4 illustrates an exemplary communications device 400 that may correspond to mobile device 120. As shown in FIG. 4, communications device 400 may include a housing 405, a microphone 410 to receive audio data, a speaker 415 to present audio data, a control button 420 to receive an input from a user, and a display 425 to present visual data. According to other embodiments, communications device 400 may comprise fewer components, additional components, different components, and/or a different arrangement of components than those illustrated in FIG. 4 and described herein.

Figure 5:
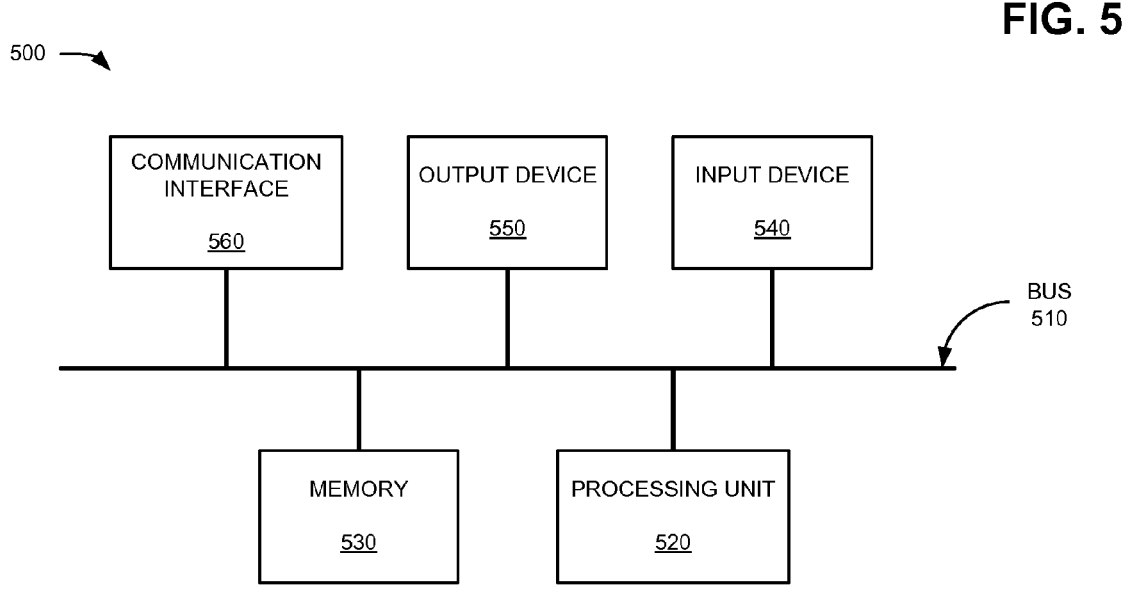
FIG. 5 is a diagram illustrating exemplary components of a computing device that may be included in the environment of FIG. 2.

FIG. 5 is a diagram illustrating exemplary functional components of a computing device 500 according to an implementation described herein. Wearable device 110, mobile device 120, an element of network 220/local area network 240 (e.g., a hot spot, a node, router, blade, etc.), and/or contact exchange device 230 may include one or more computing devices 500. As shown in FIG. 5, device 500 may include a bus 510, a processing unit 520, a memory 530, an input device 540, an output device 550, and a communication interface 560.

Bus 510 may include a path that permits communication among the components of device 500. Processing unit 520 may include any type of single-core processor, multi-core processor, microprocessor, latch-based processor, and/or processing logic (or families of processors, microprocessors, and/or processing logics) that interprets and executes instructions. In other embodiments, processing unit 520 may include an application-specific integrated circuit (ASIC), a field-programmable gate array (FPGA), and/or another type of integrated circuit or processing logic.

Memory 530 may include any type of dynamic storage device that may store information and/or instructions, for execution by processing unit 520, and/or any type of non-volatile storage device that may store information for use by processing unit 520. For example, memory 530 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 540 may allow an operator to input information into device 500. Input device 540 may include, for example, a keyboard, a mouse, a pen, a microphone, a remote control, an audio capture device, an image and/or video capture device, a touch-screen display, and/or another type of input device. In some embodiments, device 500 may be managed remotely and may not include input device 540. In other words, device 500 may be "headless" and may not include a keyboard, for example.

Output device 550 may output information to an operator of device 500. Output device 550 may include a display, a printer, a speaker, and/or another type of output device. For example, device 500 may include a display, which may include a liquid-crystal display (LCD) for displaying content to the customer. In some embodiments, device 500 may be managed remotely and may not include output device 550. In other words, device 500 may be "headless" and may not include a display, for example.

Communication interface 560 may include a transceiver that enables device 500 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 560 may include a transmitter that converts baseband signals to radio frequency (RF) signals and/or a receiver that converts RF signals to baseband signals.

Communication interface 560 may include and/or may be coupled to an antenna for transmitting and receiving RF signals. For example, communication interface 560 may be coupled to an antenna assembly that includes one or more antennas to transmit and/or receive RF signals. The antenna assembly may, for example, receive data from communication interface 560 and transmit RF signals associated with the data, or the antenna assembly may receive RF signals and provide them to communication interface 560 to be processed.

Communication interface 560 may include a logical component that includes input and/or output ports, input and/or output systems, and/or other input and output components that facilitate the transmission of data to other devices. For example, communication interface 560 may include a network interface card (e.g., Ethernet card) for wired communications and/or a wireless network interface (e.g., a Wi-Fi) card for wireless communications. Communication interface 560 may also include a universal serial bus (USB) port for communications over a cable, a Bluetooth® wireless interface, a RFID interface, a NFC wireless interface, and/or any other type of interface that converts data from one form to another form.

As will be described in detail below, device 500 may perform certain operations, and device 500 may perform these operations in response to processing unit 520 executing software instructions contained in a computer-readable medium, such as memory 530. A computer-readable medium may be defined as a non-transitory memory device. A memory device may be implemented within a single physical memory device or spread across multiple physical memory devices. The software instructions may be read into memory 530 from another computer-readable medium or from another device. The software instructions contained in memory 530 may cause processing unit 520 to perform processes described herein. Alternatively, hardwired circuitry may be used in place of, or in combination with, software instructions to implement processes described herein. Thus, implementations described herein are not limited to any specific combination of hardware circuitry and software.

Although FIG. 5 shows exemplary components of device 500, in other implementations, device 500 may include fewer components, different components, additional components, or differently arranged components than those depicted in FIG. 5. Additionally or alternatively, one or more components of device 500 may perform one or more tasks described as being performed by one or more other components of device 500.

Figure 6A:
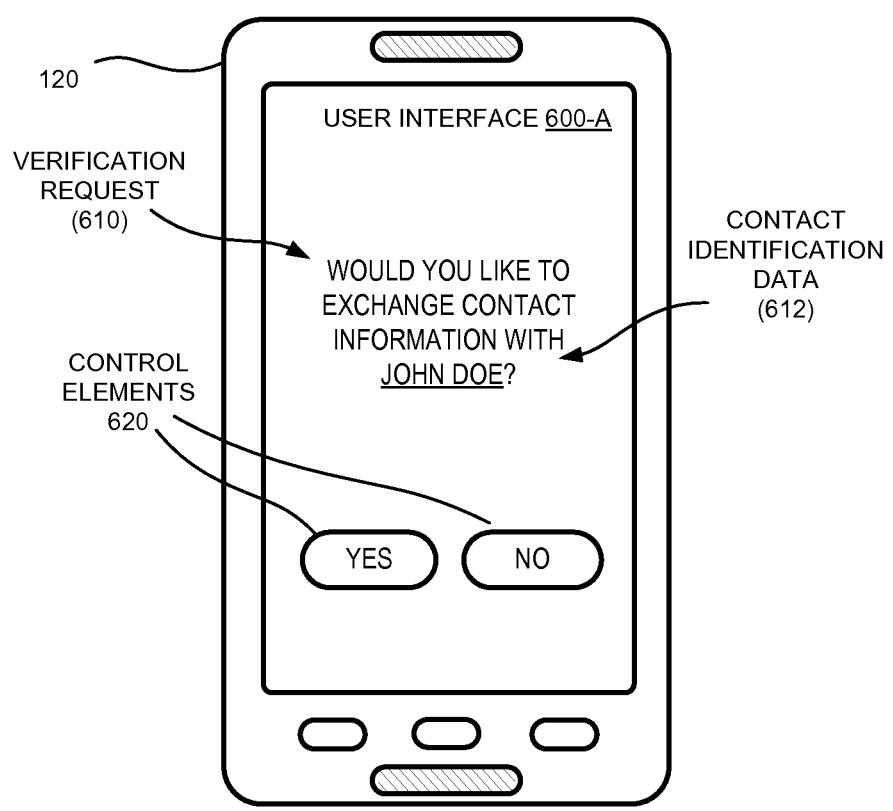
FIGS. 6A and 6B show an exemplary user interface that may be presented in the environment of FIG. 2.
Figure 6B:
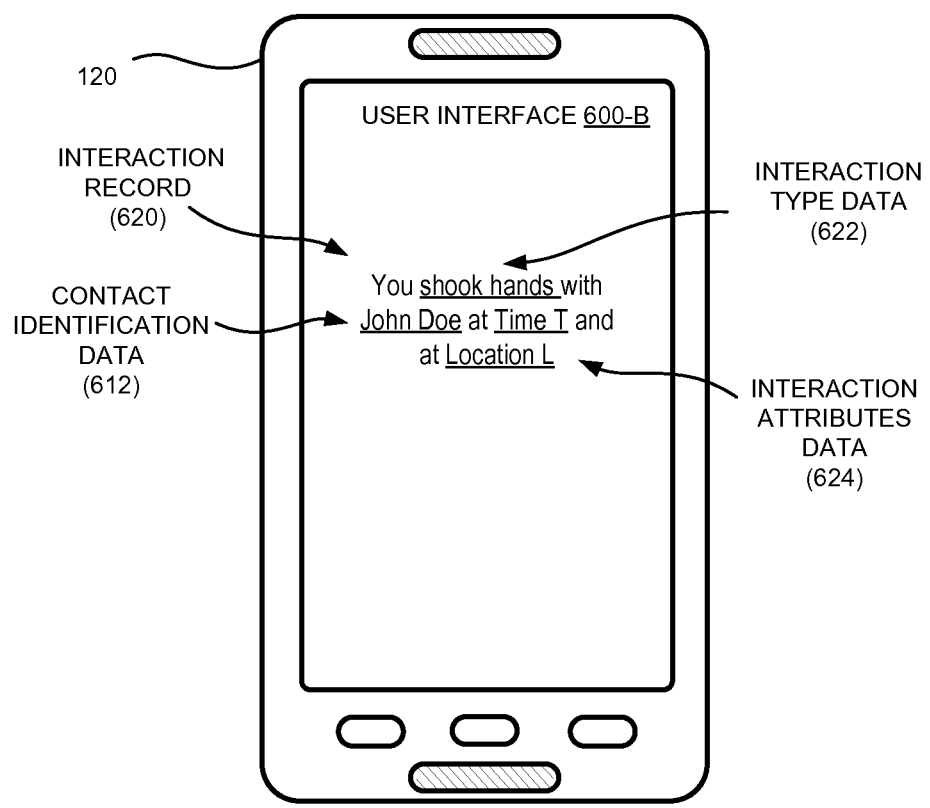

FIGS. 6A and 6B show an exemplary user interface 600-A and 600-B (referred to collectively as user interface 600) that may be presented by mobile device 120 in certain implementations. In the example shown in FIG. 6A, user interface 600-A may include a verification request 610 and control elements 620 (shown in FIG. 6A as "Yes" and "No" icons that may be selected, e.g., via a touch screen display to accept/reject the verification request 610). Verification request 610 may ask a user whether to exchange contact data 122 (e.g., the user's name, telephone number, address, etc.) with another mobile device 120.

Mobile device 120 may present verification request 610 based on receiving an indication from contact exchange device 230 that a social interaction is detected. For example, mobile device 120 may present verification request 610 based on receiving an indication that a detected motion 101 sensed by an associated wearable device 110 and/or additional attributes, such as a time, location, network connection, an environment condition (e.g., temperature, humidity level, barometric pressure) associated with detected motion 101 match attributes detected by another wearable device 110/mobile device 120.

As shown in FIG. 6A, connection request 610 may include contact identification data 612 that includes a name of a person ("John Doe"). In this way, connection request 610 allows a user of mobile device 120 to verify that the user: (1) wishes to exchange contact information with another mobile device 120; and (2) the exchange should occur with a mobile device 120 associated with a person named in contact identification data 612.

Contact identification data 612 may be based on information received from contact exchange device 230. For example, contact exchange device 230 may provide information identifying the other user and/or information associated with the other mobile device 120 (e.g., a telephone number, network address, a media access control (MAC) address, etc.). If the data received from contact exchange device 230 does not identify the other user, mobile device 120 may use the data regarding the other mobile device 120 to establish a communication to obtain the other user's name if the communication is accepted by the users.

Additionally or alternatively, verification request 610 may include information regarding the detected social interaction. For example, contact identification data 612 may identify a social interaction type (e.g., "Handshake"), a geographic location where detected motion 101 occurred, a time when detected motion 101 occurred, environment conditions such as weather, light, sound conditions, names of users associated with other mobile devices at the geographic location, a business located at the geographic location, etc. In this way, verification request 610 can present details regarding a social interaction to allow a user to accept an exchange of contact data 122 even if the user does not know the other user's name. For example, verification request 610 may ask the user to confirm whether to exchange contact data based on an identified social interaction that occurred at a particular place and time.

In another example shown in FIG. 6B, user interface 600-B may present an interaction record 620 that presents attributes of a detected social interaction. For example, interaction record 620 may present interaction type data 622 identifying a detected type of social interaction, contact information data 612 identifying the other user involved with the social interaction, and/or interaction attributes data 624 that identify a time, a location, etc. associated with the detected motion 101. Mobile device 120 may generate and present a record of a social interaction even if contact data 122 is not exchanged (e.g., the user rejects verification request 610).

Although FIGS. 6A and 6B show exemplary types of data presented by user interface 600, in other implementations, user interface 600 may include fewer data types, different data types, additional data types, or differently arranged data types than those depicted in FIGS. 6A and 6B. Additionally or alternatively, one or more portions of user interface may present data described as being presented by another portion of user interface 600.

Figure 7:
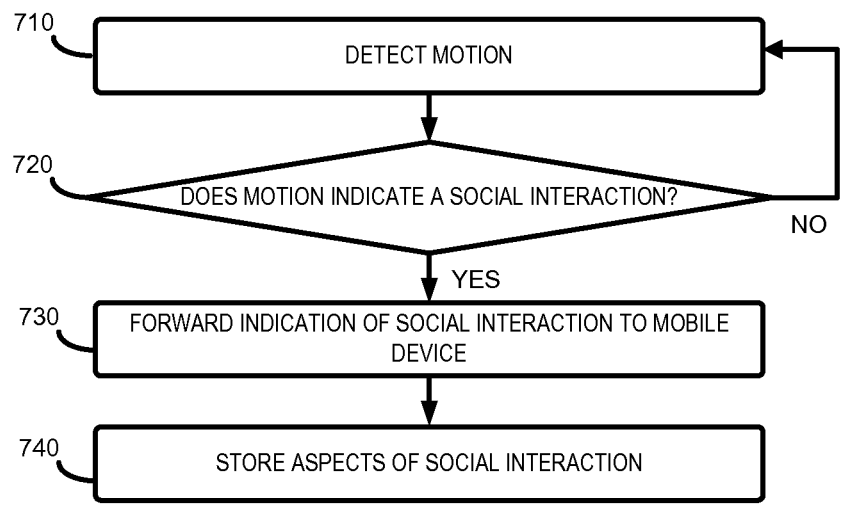
FIG. 7 shows an exemplary process for detecting a social interaction in the environment of FIG. 2.

FIG. 7 shows an exemplary process 700 for detecting a social interaction. In some implementations, process 700 may be performed by wearable device 110. In other implementations, some or all of process 700 may be performed by another device or a group of devices separate from and/or including wearable device 110, such as mobile device 120 and/or contact exchange device 230.

As shown in FIG. 7, process 700 may include detecting a motion 101 (block 710), and determining whether detected motion 101 indicates a social interaction (block 720). For example, a motion sensor (e.g., a gyroscope, accelerometer, etc.) included in wearable device 110 may detect a motion 110 by an associated user. Wearable device 110 may store motion patterns associated with one or more social interactions, and in block 720, wearable device 110 may determine whether detected motion 101 corresponds to (e.g., matches within a threshold value, such as an 80% correspondence) one of the stored motion patterns. For example, wearable device 110 may distinguish between vertical hand motions associated with a handshake and different vertical hand motions (e.g., using a hammer) based on the different ranges and speeds of the motions, a number of motion repetitions, uniformity of the motions, duration of the movements, movement patterns before and/or after the vertical hand motions, etc.

In one implementation, wearable device 110 may store a different motion pattern for different geographic regions. For example, wearable device 110 may store a first motion pattern for a European handshake, a second motion pattern for a North American handshake, and a third motion pattern for a Asian handshake. Wearable device 110 may determine a geographic location associated with the detected motion and/or a geographic location associated with the user (e.g., the user's home/office), and wearable device 110 may select one or more of the motions patterns based on the determined geographic location. Wearable device 110 may then determine whether detected motion 101 corresponds to one of the selected motion patterns associated with the geographic region.

In another implementation, wearable device 110 may include a training mode that a user may use to program personalized motion patterns associated with different social interactions. For example, a user may indicate to wearable device 110 when the user performs a type of social interaction (e.g., a handshake), and wearable device 110 may detect and record the user's actual motion pattern for the social interaction.

As shown in FIG. 7, if wearable device 110 determines that detected motion 110 corresponds to a social interaction (block 720—Yes), wearable device may forward an indication of the social interaction to an associated mobile device 120 (block 730). For example, the social interaction indication 112 may include data describing the detected motion 110, information regarding a time and/or location associated with detected motion 110, etc. Wearable device 110 may further store attributes of the social interaction, such as the detection motion 101 (block 740).

Figure 8:
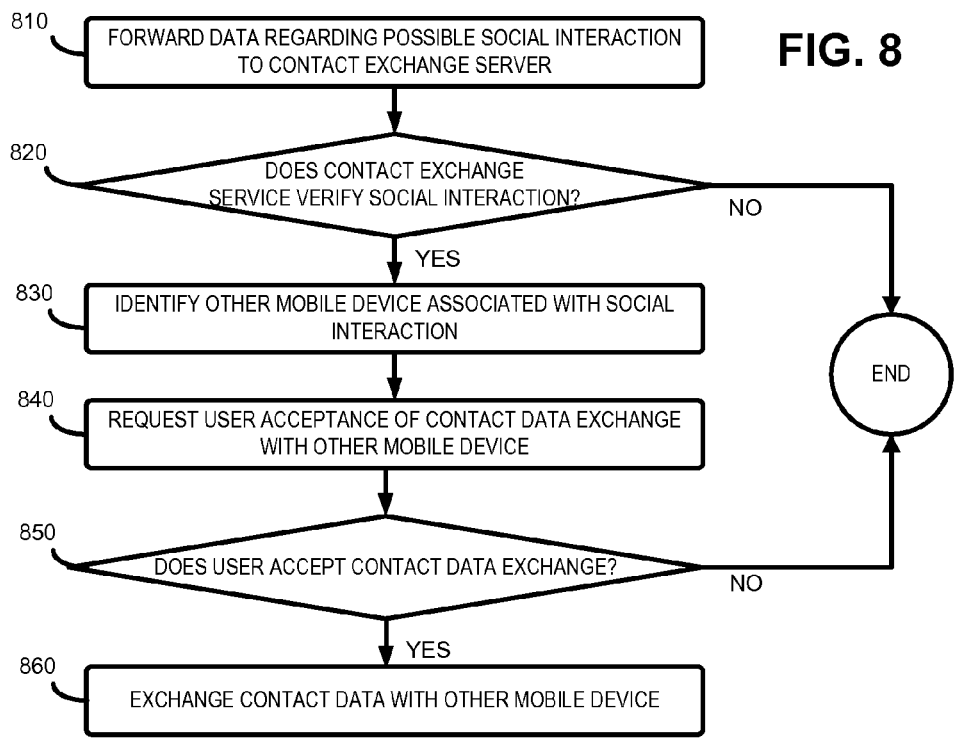
FIG. 8 shows an exemplary process for determining whether to exchange contact data based on detecting a social interaction in the environment of FIG. 2.

FIG. 8 shows an exemplary process 800 for determining whether to exchange contact data 122 based on detecting a social interaction. In some implementations, process 800 may be performed by mobile device 120 based on receiving social interaction data 112 (e.g., from wearable device 110 in block 730). In other implementations, some or all of process 800 may be performed by another device or a group of devices separate from and/or including mobile device 120, such as wearable device 110 and/or contact exchange device 230.

As shown in FIG. 8, process 800 may include forwarding data regarding the social interaction to contact exchange device 230 (block 810). For example, mobile device 120 may forward, to contact exchange device 230, data identifying attributes of detected motion 101 (e.g., a range of motion, velocity, duration, etc.), and other data detected by mobile device 120. For example, mobile device 120 may collect and forward data regarding a surrounding environment (e.g., location, temperature, humidity, air pressure, ambient light/sound conditions, etc.) or about an associated user at the time of the detected motion 101.

Contact exchange device 230 may compare the data about the detected social interaction, as received from mobile device 120, to social interaction data received from one or more other mobile devices 120. Contact exchange device 230 may verify whether the social interaction data received from mobile device 120 corresponds to social interaction data received from another mobile device 120 (block 820). For example, contact exchange device 230 may determine whether two mobile devices 120 reported a similar social interaction (e.g., a handshake) occurring at a common place and/or a common time. If contact exchange device 230 determines that a social interaction reported by mobile device 120 does not match social interactions reported by another mobile device 120 (block 820—No), process 800 may end without any exchange of contact data by mobile device 120.

If mobile device 120 received an indication from contact exchange device 230 that a social interaction reported by mobile device 120 matches a social interaction by another mobile device 120 (block 820—Yes), mobile device 120 may identify the other mobile device 120 associated with the interaction. For example, mobile device 120 may receive information (e.g., a telephone number, MDN, network address, MAC address, etc.) about the other mobile device 120 from contact exchange device 230. In another example, mobile device 120 may receive certain contact information (e.g., a telephone number and/or user name) associated with the other mobile device 110 from contact exchange device 230. In another example, contact exchange device 230 may forward instructions to cause two mobile devices 120, associated with users in a social interaction, to connect with each other directly (e.g. via local area network 240) or indirectly (e.g., via one or more nodes of network 120). For example, contact exchange device 230 may cause one of the mobile devices 120 to function as a mobile hotspot (e.g., to provide communications via Wi-Fi®) and may forward information regarding the mobile hotspot to the other mobile device 120.

As shown in FIG. 8, process 800 may further include mobile device 120 requesting user acceptance of a contact data exchange with another mobile device 120 (block 840), and determining whether the user accepted the exchange of contact data (block 850). For example, as described above in the discussion of FIG. 6A, mobile device 120 may receive some information associated with another user (e.g., a user identifier 612) from contact exchange device 230, and mobile device 120 may present a verification request 610 that includes user identification data 612 and/or another attribute of the detected social interaction. If the user does not accept the contact data exchange (block 850—No), process 800 may end without an exchange of contact data 122. Otherwise, if the user accepts the exchange of contact data 122 (block 850—Yes), mobile device 120 may exchange the user's contact information with the other mobile device 120 (block 860). For example, mobile device 120 may forward a message to contact exchange device 230, and the message may authorize contact exchange device 230 to release certain contact information associated with a user of mobile device 120. In another example, mobile device 120 may use information provided by contact exchange device 230 to establish communications with the mobile device 120, and may exchange contact information with the other mobile device 120 via the communications.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to processes 700 and 800 of FIGS. 7 and 8, the order of the blocks and/or signals in processes 700 and 800 may be modified in other implementations. For example, in one implementation, contact exchange device 230 may identify, to a mobile device 120, data (e.g., user names) associated with two or more other mobile devices 120 reporting social interactions at a similar location during a time period. Mobile device 120 may present (e.g., via user interface 600) the data associated with the multiple other mobile devices 120 and allow a user to select from among the mobile devices 120 to exchange contact data. Further, non-dependent blocks and/or signals in processes 700 and 800 may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
  receiving, by a processor included in a first mobile device, an indication of a social interaction involving a first user associated with the first mobile device, wherein the indication includes a first attribute of a social interaction, and wherein the indication is received from a wearable device associated with the first user;

determining, by the processor, first additional attributes of the social interaction, wherein the first additional attributes include time and location information associated with the first mobile device when the indication of the social interaction is received and ambient audio automatically captured by the first mobile device when the indication of the social interaction is received;

performing, by the processor, a speech-to-text analysis of the captured ambient audio to determine the presence of terms associated with a social interaction;

forwarding, by the processor and via a network, data corresponding to the first attribute and the first additional attributes to a verification device, wherein the verification device identifies a second user involved in the social interaction and verifies the social interaction between the first user and the second user based on a comparison of second additional attributes of the social interaction received from a second mobile device associated with the second user with the first additional attributes, and wherein the verification device is different than the first mobile device, the wearable device, and the second mobile device;

receiving, by the processor and from the verification device, information associated with the second mobile device based on verification of the social interaction; and causing, by the processor, contact information associated with first user and second user to be exchanged between the first mobile device and the second mobile device using the information associated with the second mobile device.

2. The method of claim 1, wherein the first attribute relates to a motion, of the first user, detected by the wearable device.

3. The method of claim 2, wherein the wearable device identifies the social interaction from a plurality of social interactions based on the detected motion of the first user.

4. The method of claim 2, wherein the verification device receives, from a plurality of second mobile devices, data identifying motions of a plurality of second users associated with the plurality of second mobile devices that include the second mobile device, and wherein the verification device selects the second user from the plurality of second users based on determining that a motion of the second user corresponds to the motion of the first user.

5. The method of claim 2, wherein the wearable device includes a smart watch, and the social interaction includes a handshake.

6. The method of claim 1, further comprising:
presenting a verification message to the first user, wherein the verification message includes information identifying at least one of the second user or the second mobile device, and wherein the verification message prompts the first user to agree to exchange the contact information with the second user; and detecting a response to the verification message, wherein the contact information is exchanged when the response indicates that the first user agrees to exchange the contact information with the second user.

7. The method of claim 1, wherein the first additional attributes further include sensor data collected by the first mobile device.

8. A mobile device comprising:
a memory configured to store instructions; and
a processor configured to execute one or more of the instructions to:
receive an indication of a social interaction involving a first user associated with the mobile device, wherein the mobile device is a first mobile device, wherein the indication includes a first attribute of a social interaction, and wherein the indication is received from a wearable device associated with the first user;

determine first additional attributes of the social interaction, wherein the first additional attributes include time and location information associated with the first mobile device when the indication of the social interaction is received, and ambient audio automatically captured by the first mobile device when the indication of the social interaction is received;

perform a speech-to-text analysis of the captured ambient audio to determine the presence of terms associated with a social interaction;

forward, via a network, data corresponding to the first attribute and the first additional attributes to a verification device, wherein the verification device identifies a second user involved in the social interaction and verifies the social interaction between the first user and the second user based on a comparison of second additional attributes of the social interaction received from a second mobile device associated with the second user with the first additional attributes, and wherein the verification device is different than the first mobile device, the wearable device, and the second mobile device;

receive, from the verification device, information associated with the second mobile device based on verification of the social interaction; and cause contact information associated with user and other user to be exchanged between the first mobile device and the second mobile device using the information associated with the second mobile device.

9. The mobile device of claim 8, wherein the first attribute relates to a motion, of the first user, detected by the wearable device.

10. The mobile device of claim 9, wherein the wearable device identifies the social interaction from a plurality of social interactions based on the detected motion of the first user.

11. The mobile device of claim 9, wherein the verification device receives data identifying motions of a plurality of second users associated with a plurality of other mobile devices that include the second mobile device, and wherein the verification device selects the second user from the plurality of second users based on determining that a motion of the second user corresponds to the motion of the first user.

12. The mobile device of claim 9, wherein the wearable device includes a smart watch, and the social interaction includes a handshake.

13. The mobile device of claim 8, wherein the processor further executes the one or more instructions to:
present a verification message to the first user, wherein the verification message includes information identifying at least one of the second user or the second mobile device, and wherein the verification message prompts the first user to agree to exchange the contact information with the second user; and detect a response to the verification message, wherein processor causes the contact information to be exchanged when the response indicates that the first user agrees to exchange the contact information with the second user.

14. The mobile device of claim 8, further comprising a sensor, wherein the first additional attributes further include data collected by the sensor.

15. A non-transitory computer-readable medium to store instructions, wherein the instructions comprise:
  one or more instructions that, when executed by a processor associated with a first mobile device, cause the processor to:
    receive an indication of a social interaction involving a first user associated with the first mobile device, wherein the indication includes a first attribute of a social interaction, and wherein the indication is received from a wearable device associated with the first user;
    determine first additional attributes of the social interaction, wherein the first additional attributes include time and location information associated with the first mobile device when the indication of the social interaction is received, and ambient audio automatically captured by the first mobile device when the indication of the social interaction is received;
    performing a speech-to-text analysis of the captured ambient audio to determine the presence of terms associated with a social interaction;
    forward, via a network, data corresponding to the first attribute and the first additional attributes to a verification device, wherein the verification device identifies a second user involved in the social interaction and verifies the social interaction between the first user and the second user based on a comparison of second additional attributes of the social interaction received from a second mobile device associated with the second user with the first additional attributes, and wherein the verification device is different than the first mobile device, the wearable device, and the second mobile device;
    receive, from the verification device, information associated with the second mobile device based on verification of the social interaction; and
    cause contact information associated with user and other user to be exchanged between the first mobile device and the second mobile device using the information associated with the second mobile device.

16. The non-transitory computer-readable medium of claim 15, wherein the first attribute relates to a motion, of the first user, detected by the wearable device.

17. The non-transitory computer-readable medium of claim 16, wherein the wearable device identifies the social interaction from a plurality of social interactions based on the detected motion of the first user.

18. The non-transitory computer-readable medium of claim 16, wherein the verification device receives data identifying motions of a plurality of second users associated with a plurality of other mobile devices that includes the second mobile device, and wherein the verification device selects the second user from the plurality of second users based on determining that a motion of the second user corresponds to the motion of the first user.

19. The non-transitory computer-readable medium of claim 16, wherein the wearable device includes a smart watch, and the social interaction includes a handshake.

20. The non-transitory computer-readable medium of claim 15, wherein one or more instructions further cause the processor to:
  present a verification message to the first user, wherein the verification message includes information identifying at least one of the second user or the second mobile device, and wherein the verification message prompts the first user to agree to exchange the contact information with the second user; and
  detect a response to the verification message, wherein the contact information is exchanged the response indicates that the first user agrees to exchange the contact information with the second user.

* * * * *